Aug. 29, 1944.   J. R. SNYDER ET AL   2,357,232
QUICK DISCONNECT COUPLING
Filed July 27, 1942   4 Sheets-Sheet 1
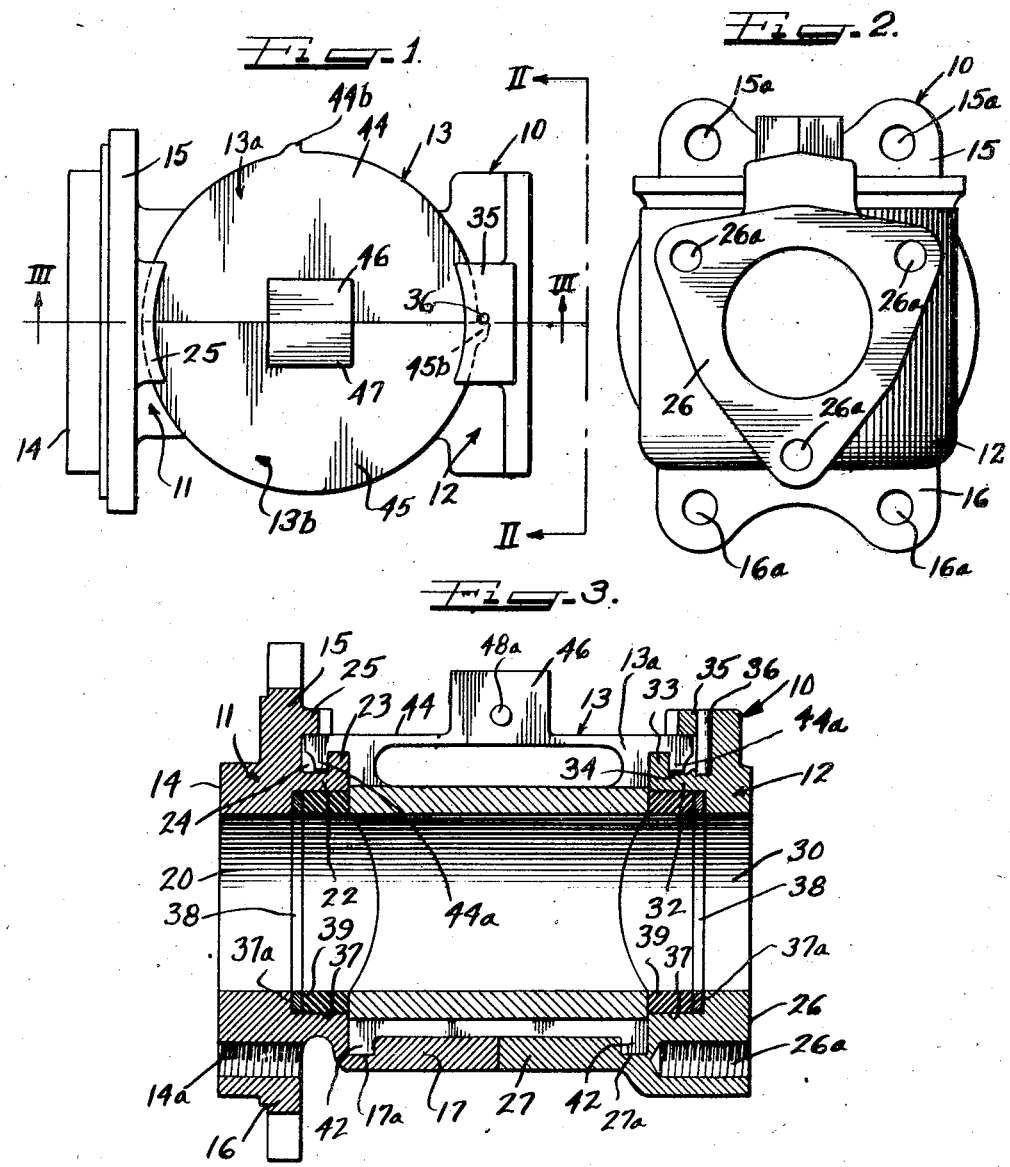
Inventors
JACOB R. SNYDER.
ARTHUR TOWNE

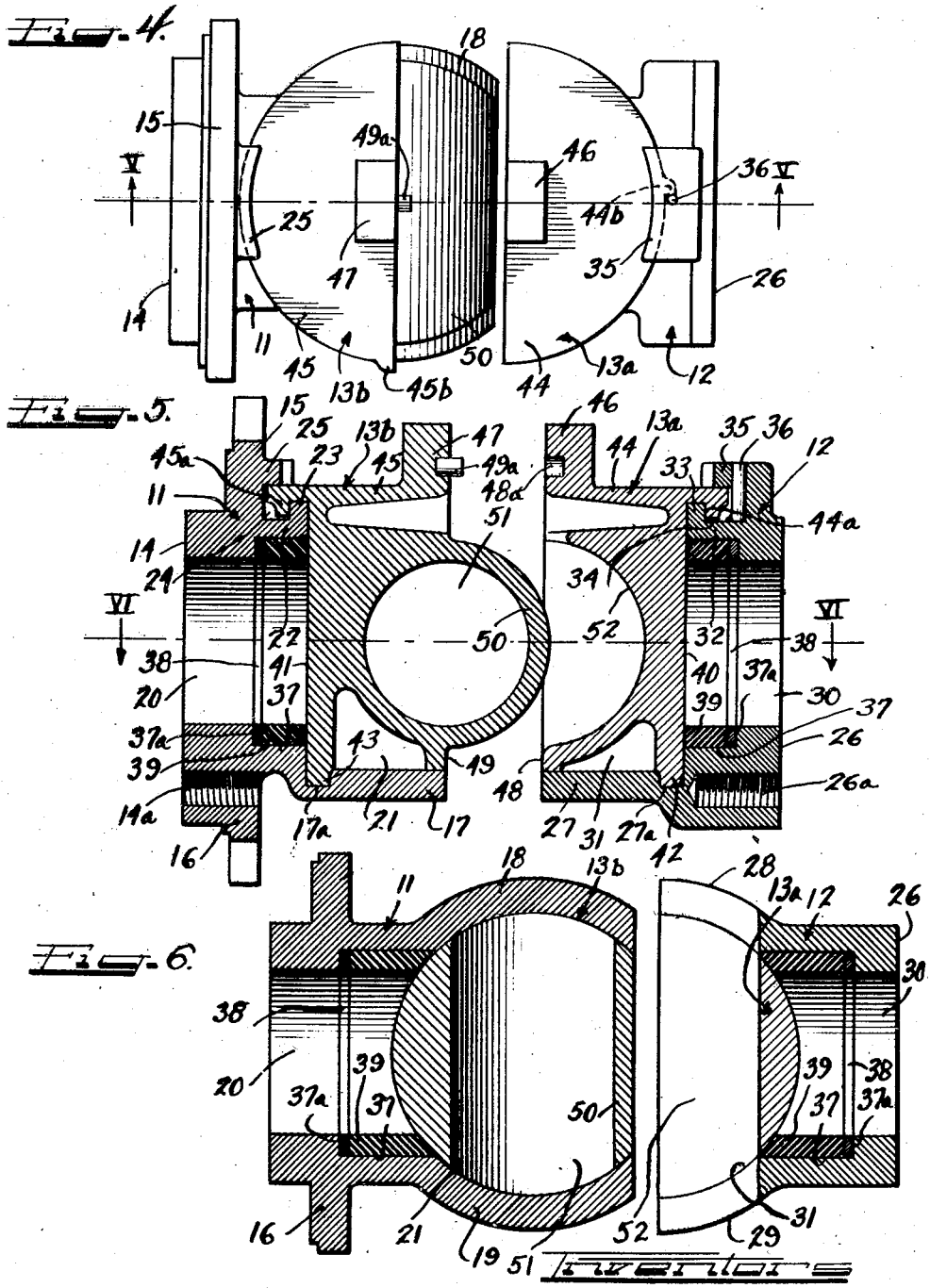

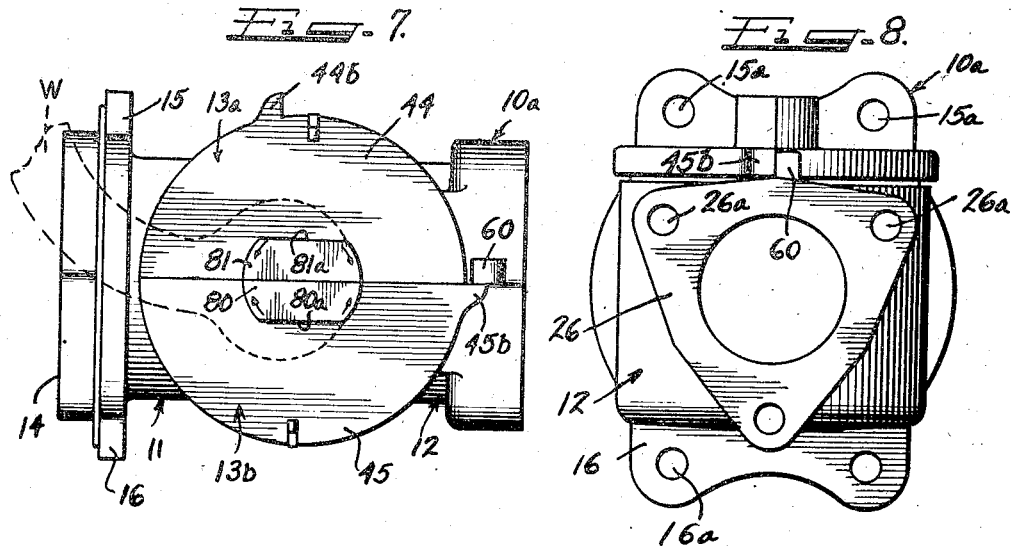
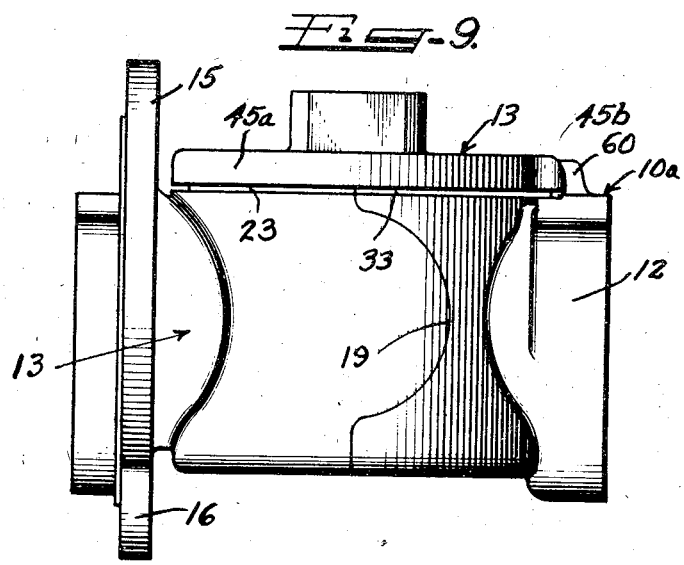

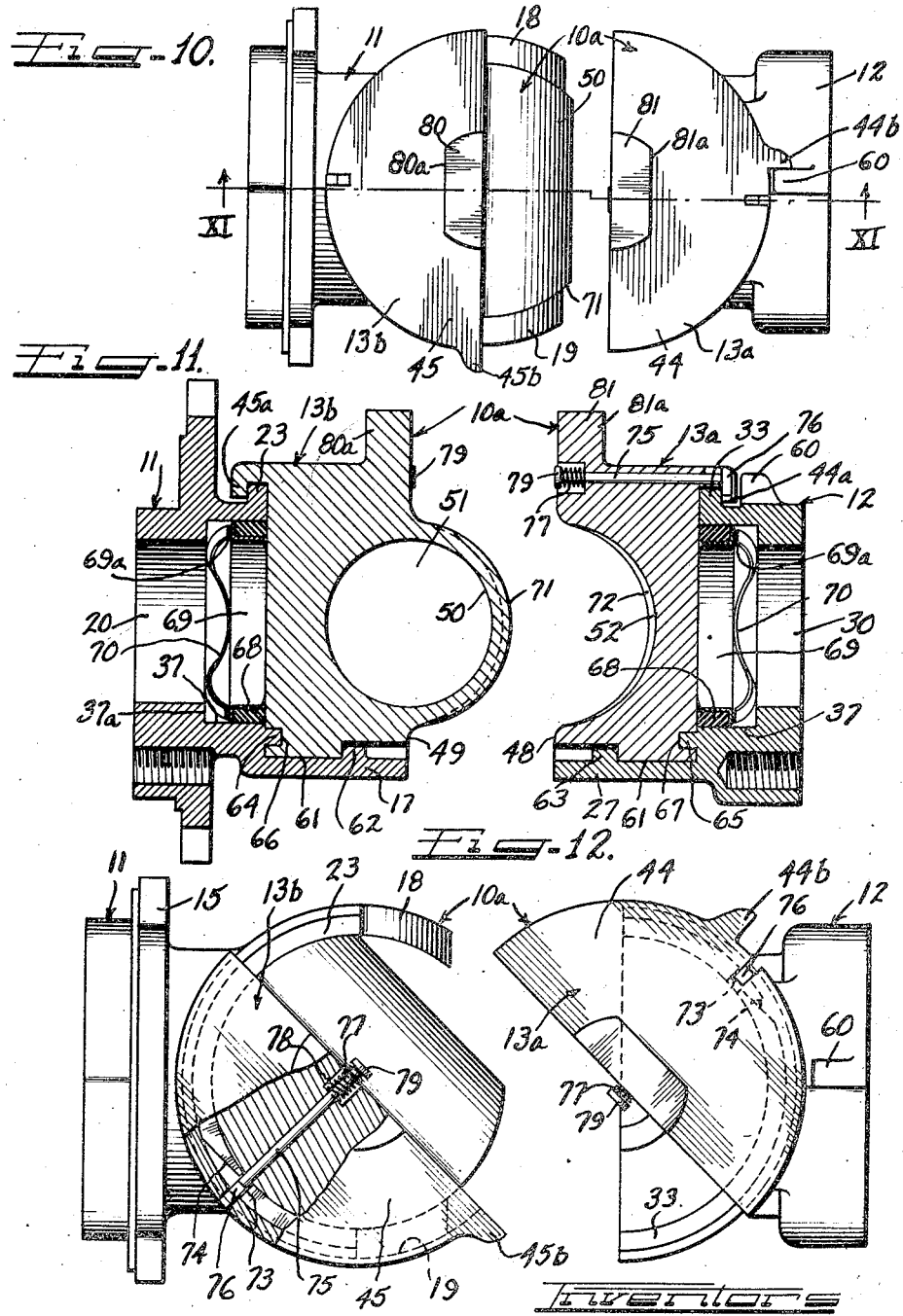

Patented Aug. 29, 1944

2,357,232

UNITED STATES PATENT OFFICE 2,357,232

QUICK DISCONNECT COUPLING

Jacob R. Snyder and Arthur Townhill, Cleveland, Ohio, assignors to Thompson Products Incorporated, Cleveland, Ohio, a corporation of Ohio Application July 27, 1942, Serial No. 452,426

10 Claims. (Cl. 284—4)

This invention relates to an improved coupling of the type having a split rotatable plug detachably connecting a pair of coupling boxes for controlling fluid flow therebetween wherein the heretofore necessary separate end caps for the coupling boxes are eliminated.

Specifically the invention relates to a readily operated coupling of the type having a split cylindrical plug joining the coupling boxes and sealing the same when they are disconnected wherein each coupling box is composed of only one piece and contains plug-receiving semi-circular tracks for retaining the plug parts in operative position without necessitating the use of other retaining means.

According to this invention complementary coupling parts are arranged for connection with the ends of tubes, hoses or other conduits which are to be placed in fluid flow communication when joined together and which are to have the ends thereof sealed when separated. A split rotatable cylindrical valve or plug detachably connects the coupling parts and controls fluid flow between the parts. A portion of the valve is retained in each coupling part for sealing the respective parts when the same are uncoupled so as to prevent loss of fluid out of the ends of the then separated conduits.

It has heretofore been necessary to utilize end caps or separate retainers on the coupling parts in order to mount the split valve in operative relation in the parts. In accordance with one form of this invention, however, the coupling parts are arranged with semi-annular grooves around the bottoms thereof and with semi-annular flanges around the tops thereof while the split valve has an annular bottom flange adapted to fit into the semi-annular grooves and an annular top groove adapted to receive the semi-annular top flanges of the coupling parts. The coupling parts of this form of the invention also have lips adapted to overlie the top of the valve for preventing removal of the valve from the coupling parts. These lips, however, extend only over a localized portion of the valve so that when the coupling parts are disconnected the valve parts can be moved to a position permitting them to be lifted out of the coupling parts.

In another form of the invention, the overhanging lips are eliminated and the split valve and coupling parts have cooperating tongues and grooves which are alone sufficient to hold the valve parts and coupling parts in assembled relation. In this form each coupling part has a semicircular flange or tongue extending upwardly around the top thereof together with an inwardly extending semi-circular tongue around the inside thereof near the bottom and an unstanding semi-annular flange on the bottom. Each valve pling parts and receiving the upwardly extending tongues of the coupling parts in the grooves thereof together with a grooved side wall receiving the inwardly extending tongues and a well in the bottom thereof receiving the upstanding flange on the bottoms of the coupling parts. The inwardly extending tongues, when seated in the grooved side walls of the valve parts, will hold the valve parts against attempted lifting removal from the couplings.

The coupling parts have flat end faces adapted to be attached to conduit nipples or other conduit fittings.

Stop lugs can be provided on the valve for engaging a stop pin or other abutment on a coupling part so that the valve will not be rotated beyond fully opened and fully closed positions.

To facilitate proper alignment of the disconnected coupling parts for the coupling operation, one mating face of a valve part can have a well therein for securing a lug or pin projecting from the mating face of the other valve. Alternatively the one mating face can protrude from the coupling part to seat in a recess provided by undercutting the mating face of the other coupling part.

A further feature of the invention resides in the provision of spring pressed locks on the valve parts to prevent removal of these parts from their coupling housings but arranged to permit movement of the valve parts to positions for at least partially uncovering the ports in the coupling housings even when the housings are disconnected so that the parts and conduits communicating therewith can be drained if desired.

An object of the invention therefore is to simplify quick disconnect couplings.

A further object of the invention is to eliminate the heretofore necessary separate end caps on coupling parts.

A still further object of the invention is to provide light-weight disconnect couplings adapted for use in airplane fuel, oil and hydraulic conduits.

Another object is to provide mating faces on coupling parts which will insure proper alignment of the parts.

Another object of the invention is to provide a self sealing detachable coupling with locking devices preventing removal of parts but allowing movement of the parts to drain positions.

A still further object of the invention is to provide a quick disconnect coupling composed of only four main parts.

Other and further objects of the invention will be apparent to those skilled in the art from the following detailed description of the annexed sheets of drawings which, by way of preferred example, illustrate several embodiments On the drawings:

Figure 1 is a top plan view of a coupling according to this invention.

Figure 2 is an end elevational view of the coupling taken along the line II—II of Figure 1.

Figure 3 is a cross-sectional view of the coupling taken along the line III—III of Figure 1.

Figure 4 is a view similar to Figure 1 but illustrating the parts in uncoupled relation.

Figure 5 is a cross-sectional view taken along the line V—V of Figure 4.

Figure 6 is a cross-sectional view taken along the line VI—VI of Figure 5.

Figure 7 is a top plan view of another form of coupling according to this invention.

Figure 8 is an end elevational view of the coupling shown in Figure 7.

Figure 9 is a side elevational view of the coupling shown in Figures 7 and 8.

Figure 10 is a top plan view of the coupling of Figures 7 to 9 but showing the coupling in disconnect sealed position.

Figure 11 is a vertical cross-sectional view along the line XI—XI of Figure 10.

Figure 12 is a top plan view, with parts broken away and shown in horizontal cross section, to illustrate underlying parts, of the coupling shown in Figures 6 to 11, in disconnect drain position.

As shown on the drawings:

As shown in Figures 1 to 3, the reference numeral 10 designates generally a coupling according to this invention composed of coupling boxes 11 and 12 and a split rotatable valve 13 carried by the coupling boxes and composed of half-sections 13a and 13b.

The box 11 has a flat end face 14 with internally threaded holes 14a extending inwardly therefrom for receiving an attachment member (not shown) on the end of a conduit. Top and bottom flanges 15 and 16 respectively are provided on the coupling box 11 in inwardly spaced relation from the end face 14. These flanges 15 and 16, as best shown in Figure 2, can have apertures 15a and 16a therethrough for attaching the coupling box to a supporting wall such as, for example, the fire wall of an airplane engine nacelle (not shown).

As best shown in Figures 3 and 5, the coupling box 11 has a flat bottom wall 17 projecting forwardly from the flange 16. This bottom wall 17 has a semi-circular groove 17a on the inner face thereof.

As shown in Figure 6, the coupling box 11 has segmental cylindrical side walls 18 and 19. These side walls extend from the flat bottom 17.

A cylindrical passageway 20 extends inwardly from the flat end face 14 of the coupling box into an intersecting vertical segmental cylindrical chamber 21 defined by the bottom wall 17 and the side walls 18 and 19. This intersecting cylindrical chamber therefore has an open end and an open top.

As best shown in Figures 3 and 5, the coupling box 11 has a short top wall 22 extending forwardly from the flange 15. The forward end of this wall 22 has an upstanding semi-circular flange 23 spaced from the flange 15 so as to provide therebetween a semi-circular groove 24.

As shown in Figures 1, 3, 4 and 5, a lip or horizontal flange 25 projects forwardly from the flange 15 above the groove 24 and in spaced relation from the flange 23. This lip extends only along the central portion of the flange 15 as shown in Figures 1 and 4.

The coupling box 12 has a flat end face 26 similar to the end face 14 of the box 11 and having a plurality of internally threaded holes 26a extending inwardly therefrom for attachment of the box 12 to a fitting on the end of a conduit. The box 12 also has a flat bottom wall 27 similar to the bottom wall 17 of the box 11. The inner ends of these flat bottom walls 17 and 27 are adapted to be placed in abutting relation as shown in Figure 3. The box 12 also has semi-cylindrical side walls 28 and 29 similar to the side walls 18 and 19 of the box 11. The inner ends of the respective side walls 18, 28, and 19, 29 are adapted to be placed in abutting relation as will be evident from Figure 6.

The box 12 also has a horizontal cylindrical passageway 30 extending inwardly from the flat end face 26 thereof and communicating at its inner end with an intersecting vertical chamber 31 defined by the flat bottom wall 27 and the cylindrical side walls 28 and 29. This chamber 31 has an open end and an open top.

The flat bottom wall 27 of the box 12 has a semi-circular groove 27a therein. When the inner ends of the flat walls 17 and 27 are placed in abutment, the grooves 17a and 27a thereof will register so as to provide a full circular groove within the chamber portions 21 and 31.

The box 12, like the box 11, has a short flat top wall portion 32 forming a top for the inner end of the passageway 30 and having an outturned semi-circular vertical flange or lug 33 therearound. A semi-circular groove 34 is thus provided behind the flange 33 on the top wall 32. This groove is adapted to register with the groove 24 when the coupling boxes 11 and 12 are placed in abutment so as to define a full circular groove around the top of the assembly.

The central portion of the top of the coupling box 12 has a flange or lip 35 overlapping the groove 34 in spaced relation from the flange 33. This lip 35, as best shown in Figures 1 and 4, extends only over a portion of the groove 34.

A pin 36 projects through the flange 35 into the outer peripheral portion of the groove 34 to form an abutment surface therein for limiting movement of the valve 13 as will be hereinafter more fully explained.

The passageways 20 and 30 of the coupling boxes 11 and 12 are each counterbored at their inner ends as at 37 and have shoulders 37a at the ends of the counterbores.

A spring washer 38 is seated in each counterbore 37 against the shoulder 37a and a sleeve 39 is slidably mounted in each counterbore 37 to be acted on by the spring washer 38. The inner edges of the sleeves 39 are cylindrical in conformity with the chambers 21 and 31 of the respective coupling boxes and the spring washers 38 urge these inner edges of the sleeves against the plug valve. The sleeves thus act as seals preventing leakage out of the passageways 20 and 30 when the coupling is in disconnect position as shown in Figures 5 and 6 and between the passageways and exterior of the plug valve when the coupling is in connect position as shown in Figure 3. The sleeves 39, although slidable in the counterbores 37, are expanded radially by being squeezed between the springs 38 and plug walls so as to have a snug fit in the counterbore thereby sealing the counterbores. In addition the sleeves 39, by being spring urged against the plug valve parts, will act as brakes to prevent unauthorized rotation of the parts by vibration and the like.

The coupling boxes, when placed together in abutting relation, thus define an open-topped cylindrical chamber receiving the cylindrical plug valve 13 together with laterally projecting cylindrical chambers 20 and 30 communicating with the central plug-receiving chamber at their inner ends and adapted to communicate at their outer ends with conduit fittings attached to the end faces of the boxes.

The valve parts 13a and 13b have semi-cylindrical side walls 40 and 41 respectively for bearing engagement with the side walls of the coupling boxes. These cylindrical side walls 41 and 40 also project into the grooves 17a and 27a of the coupling boxes as best shown in Figures 3 and 5. Thus the valve parts 13a and 13b have rim ends 42 and 43 for riding in the grooves 27a and 17a.

The valve parts 13a and 13b have flat top walls 44 and 45 respectively (Fig. 5) projecting beyond the side walls 40 and 41 and having downturned semi-circular end flanges 44a and 45a respectively for engaging the flanges 33 and 23 of the coupling boxes. The projecting portions of the top wall are adapted to fit under the flanges 35 and 25 of the coupling boxes. The wall 44 also has an extended lug or ear 44b adapted to engage the stop pin 36. Likewise the wall 45 has a stop lug or ear 45b adapted to engage the other side of the stop pin. As shown in Figure 4 the lug 44b is positioned so that it will engage the stop pin 36 when the valve plug 13a is moved to closed position. As shown in Figure 1 the lug 45b is positioned to engage the other side of the stop pin 36 when the valve is rotated to open position.

The walls 44 and 45 of the valve parts 13a and 13b have upwardly extending lugs 46 and 47 respectively for engagement by a turning tool to rotate the valve parts in the coupling boxes.

The valve parts 13a and 13b as best shown in Figure 5, have flat inner end faces 48 and 49 extending around the periphery thereof for abutting relation when the coupling boxes are placed together for the coupling operation. The valve part 13b has a cylindrical wall 50 defining a cylindrical chamber 51 therethrough. The valve part 13a is cylindrically recessed as at 52 to receive the wall 50 of the part 13b. To insure proper alignment of the end faces 48 and 49 for the coupling operation a recess 48a is provided in the end face 48 to receive a pin 49a projecting from the face 49.

The plug part 13a is operatively mounted in the coupling box 12 by dropping the same between the side walls 28 and 29 thereof into the groove 27a in the bottom wall. To permit this, of course, the valve part must be rotated so that its flange 44a will clear the overhanging lip 35. The plug part is then rotated so as to move the flange 44a under the lip. The plug part 13b is inserted in the coupling box 11 in a similar manner.

To join the coupling boxes in fluid flow relation it is only necessary to move the same into abutment and to position the valve parts or plug parts carried thereby so that the faces 48 and 49 thereof can be placed in abutting relation and so that the wall 50 can be seated in the recess 52 and the pin 49a seated in the recess 48a. The parts 13a and 13b are then seated together so that they must turn as a unit. Engagement of the lug portions 46 and 47 by a turning wrench will then make possible rotation of the valve parts as a unit 13 so that the same can be rotated to open position for joining the passageways 20 and 30 of the coupling boxes together through the conduit or intermediate passageway 51. However, in rotating the plug parts, a portion of the side wall 42 of the part 13a will be seated in the grooves 17a and 27a of both boxes as shown in Figure 3. Likewise the flange 44a will be seated behind the flanges 23 and 33 of both boxes. In a similar manner the other cooperating side wall 43 and flange 45a will be seated in cooperating grooves and tracks of both coupling boxes. As a result the boxes are held together by mere rotation of the plug valve from a closed to an opened position. When the plug valve is in opened position for joining the coupling boxes, the stop 45b will be moved toward the stop pin 36. To uncouple the boxes it is merely necessary to reversely rotate the plug valve and move the lug 44b toward the stop pin 36. This will bring the side walls 40 and 41 of the respective valve parts across the inner ends of the passageways 30 and 20 to close these passageways and at the same time will move the flanges of the respective valve parts wholly within the tracks of one box.

Another form of coupling 10a is shown in Figures 7 to 12. The coupling 10a, like the coupling 10, is composed of a pair of coupling boxes and a split rotatable valve rotatably carried by the coupling boxes so that one piece of the valve is held by each box to seal the port in the box when the boxes are disconnected and so that both pieces of the valve are partially disposed in each box when the coupling is connected for joining the ports of the boxes in fluid flow communication.

Thus, as shown in Figures 7 to 12, parts corresponding with parts illustrated and described in connection with Figures 1 to 6 have been marked with the identical reference numerals.

It will be noted in Figures 7 to 12 that the overhanging lips 25a and 35a of the coupling boxes 11 and 12 of Figures 1 to 6 have been eliminated, and that the coupling box 12 is only equipped with an upstanding lug 60 for defining an abutment against which the ears 44b and 45b of the valve parts will strike to limit movement of the valve parts to a quarter-turn rotation and thereby insure complete coupling and uncoupling of the coupling boxes. It will also be noted that the flange 15 on the coupling box 11 lies in the path of movement of the ears 44b and 45b so as to prevent complete seating of the valve part 13a in the coupling box 11 and so as to prevent removal in one direction of the valve part 13b from the coupling box 11 when the coupling is in disconnect position.

Likewise the ear 44b will strike against the lug 60 to prevent removal of the coupling box 13a from the box 12 in one direction. As will be hereinafter explained, spring pressed locking means are provided for preventing removal of the valve parts from their respective coupling boxes by rotation in the opposite direction not restricted by the lug 60 or the flange 15.

As best shown in Figure 11, the upstanding flanges 23 and 33 of the coupling boxes 11 and 12 and the downturned end flanges 44a and 45a of the valve parts are substantially identical with the arrangement shown in Figure 5. However, as shown in Figure 11, the bottoms 17 and 27 of the coupling boxes have wider grooves 61 than the corresponding grooves 17a and 27a. Central upstanding semi-annular flanges 62 and 63 in the respective coupling boxes define the inner ends of the grooves 61.

Semi-circular tongues 64 and 65 extend inwardly from the cylindrical inner side walls of the coupling boxes near the bottoms 17 and 27 thereof to seat in semi-annular grooves 66 and 67 formed in the side walls of the valve parts 13b and 13a. This tongue and groove construction eliminates the necessity for the overhanging lips 25 and 35 of the coupling 10. The valve parts are rotated into their respective coupling boxes and, once they are seated in these boxes, they cannot be lifted out since the tongues 64 and 65 will prevent the valve parts from being lifted away from the bottoms of the coupling boxes.

As also shown in Figure 11, the seal construction is somewhat different than that shown in Figure 5. In Figure 11 sealing sleeves 68 are mounted in the counterbores 37. These sleeves are preferably composed of a plastic material such as an oil and solvent resisting rubber. A metal liner 69 is provided for each sleeve 68. The liner has an inner edge spaced inwardly from the inner edge of the sleeve so that it will not scrape against the cylindrical wall of the valve part.

An outturned flange 69a is provided on each liner and a corrugated spring type washer 70 is disposed between the shoulder 37a of the counterbore and the flange 69a of the liner to urge the assembly toward the valve parts.

The liner will prevent inward collapse of the sleeve and the sleeve will effectively form a seal against the adjacent valve part as well as against the counterbore since it will be somewhat expanded radially as it is squeezed between the valve parts and the outturned flange of the liner.

As best shown in Figures 10 and 11 the cylindrical wall 50 of the valve part 13a is formed so that it will project beyond the side walls of the coupling box 11 as at 71. The receiving recess 52 of the valve part 13a in turn is formed so that it will lie within the side walls of the coupling box 13a as indicated at 72. In this manner, the projecting portion 71 is seated in the recess provided at 72 to insure proper alignment of the valve parts and coupling boxes when the same are brought together for the coupling operation. The projecting cylindrical wall and the pocket for this projecting portion will eliminate the necessity for the pin 49a and the recess 48a of the form of the coupling shown in Figures 1 to 6.

As best shown in Figure 12, the rim or flange 23 of the coupling box 11 is slotted as at 73 and is inwardly beveled as at 74 on one side of the slot 73. The flange 33 of the coupling box 12 is similarly slotted and beveled.

A pin 75 projects through the top portion of the valve part 13b and has a vertical key 76 on the outer end thereof for riding around the outer face of the flange 23 until it reaches the beveled portion 74 whereupon a spring 77 disposed around the inner end of the pin 75 and held under compression between the bottom of a well 78 formed in the valve part and a head 79 formed on the end of the pin, will pull the key into the slot 73 thereby locking the valve part 13b against further rotation in a counter-clockwise direction. The valve part 13b, however, is free to move in a clockwise direction since the key 76 will ride on the beveled portion 74 and move to the outer face of the flange 23. The clockwise rotation of the valve part 13b, however, is limited by the lug 45b which will strike against the flange 15 before the valve part can be moved out of the coupling box.

A similar key, spring, and pin construction is provided on the valve part 13a. The key on the valve part 13a will limit counter-clockwise movement of the valve part beyond the position shown but the valve part can move in a clockwise direction until the lug 44b strikes the lug 60 on the coupling housing 12.

When the valve parts 13a and 13b are moved to the positions shown in Figure 12, the passageways 20 and 30 of the coupling boxes are partially opened since the conduit passageway 51 of the valve part 13b will be in communication with the port 20 while the recess 52 will be in communication with the passageway 30. In this manner, conduit lines to which the coupling boxes are connected can be drained if desired. However, the valve parts cannot be rotated out of the coupling boxes unless the heads 79 of the pins are depressed so as to move the keys 76 out of the slots 73.

When it is desired to join the coupling boxes and to place the passageways 20 and 30 in full communicating relation, the valve parts are rotated to the position shown in Figures 10 and 11. When the mating faces 48 and 49 of the valve parts are then brought into face to face engagement, the heads 79 of the pins 75 will abut each other and the pins will be moved so that the keys 76 cannot drop into the slots 73. In such position the valve parts can be moved together as a unit between fully closed uncoupled position, as shown in Figure 10, to fully opened coupled position, as shown in Figures 7 to 9, upon reverse quarter-turn rotation.

As best shown in Figure 7, the valve parts 13a and 13b have central upstanding lugs 80 and 81 providing flat wrench-engaging faces 80a and 81a respectively. These faces are parallel with the mating faces 48 and 49 of the valve parts as best shown in Figures 10 and 11 so that, when these mating faces are brought together and a wrench W (Figure 1) is placed over the lugs 80 and 81 and rotated to join the coupling boxes, the thrusting forces of the wrench will serve to draw the mating faces of the valve parts closer together and further insure proper movement of the valve parts as a true cylindrical unit. Thus, as indicated by the arrows in Figure 7, the cocking effect produced by rotation of the wrench W will actually draw the coupling parts 13a and 13b together. This is, of course, highly desirable.

From the above descriptions it will be understood that in both illustrated forms of the invention quarter turn rotation of the valve not only places the coupling boxes in connected relation, but also places the passageways of these boxes in full fluid flow communication. Reverse quarter turn rotation of the plug valve disconnects the coupling boxes and seals the passageways of these boxes so that leakage out of conduit ends to which the boxes may be attached is prevented. The seals will serve as brakes resisting unauthorized rotation of the plug valve so that, when the coupling boxes are disconnected, the valve parts retained therein will not move from sealing positions unless intentionally moved to drain positions.

Each coupling box can be cast or forged in one piece. Likewise each valve part can be cast or forged in one piece so that the total assembly is only composed of four main pieces. The arrangement of the grooves and flanges on the respective parts eliminates the necessity for separate end caps or closure plates on the coupling boxes, which had to be assembled on the boxes after the plug parts were inserted.

It will, of course, be understood that various details of the invention may be varied through a wide range without departing from the principles of this invention and it is, therefore, not the purpose to limit the patent granted hereon otherwise than necessitated by the scope of the appended claims.

We claim as our invention:

1. A coupling comprising a pair of complementary semi cup-like coupling boxes having mating inner faces adapted to be placed in abutting position, said boxes, when abutted together providing a cup and defining an open topped closed bottom cylindrical chamber, a cylindrical plug rotatable in said chamber having a top wall ridable on the mouth of the chamber, and means on said boxes overlying said top wall of the plug to retain the plug in position.

2. A quick disconnect coupling comprising a coupling box having side walls defining a segmental cylindrical recess, a bottom wall on said coupling box closing the bottom of the recess, a semi-circular groove in said bottom wall, a semi-circular valve part in said recess having a rim end ridable in said groove, said valve part having a top wall closing the top of said recess, said top wall having a flange overlying said coupling box and said coupling box having a lip overlying said flange whereby the valve part is rotatably held in the coupling box.

3. A coupling comprising a pair of coupling boxes together defining a central open topped cylindrical chamber having ports in the side walls thereof, and a bottom wall closing one end of said chamber, a split cylindrical plug having a circular rim end, a circular groove in said bottom wall receiving said rim end of the plug, said plug having a top wall closing the top of said chamber and overlying the coupling boxes, said overlying portions of the top wall having a circular groove therein, a circular flange on the coupling boxes extending into said groove of the top wall, and lip means on each of the coupling boxes overlying said top wall of the valve to retain the valve in the boxes.

4. A coupling comprising a pair of coupling boxes adapted to be placed together to define an open topped closed bottomed valve chamber, a split plug valve rotatably mounted in said chamber and having a grooved flange overlying the boxes, upstanding semi-annular flanges on said coupling boxes together defining a circular tongue seated in said groove, said plug valve having a peripheral groove around the side wall thereof, and tongues projecting into said chamber seated in said circumferential groove whereby the tongue and groove means will rotatably retain the valve parts in the coupling boxes.

5. A quick disconnect sealing coupling which comprises a pair of coupling boxes together defining an open topped closed bottomed valve chamber, a split plug valve rotatably mounted in said chamber, lugs on each split portion of the plug valve, and abutment means for said lugs on at least one of said coupling boxes to limit the amount of rotation of the plug valve relative to the coupling boxes.

6. A coupling comprising a pair of coupling boxes having passageways therethrough and together defining a cylindrical chamber normal to said passageways in communication therewith, a split cylindrical plug rotatably mounted in said chamber and having a passage therethrough providing a connecting conduit section between the passageways, a projecting wall portion on one plug part, a recess for receiving said wall portion in the other plug part, said projecting wall portion extending beyond the coupling box in which the plug part is rotatably mounted and said recessed portion of the other plug part extending inwardly from the wall of its coupling box whereby the projecting wall portion is adapted to seat in said recess for properly aligning the coupling boxes and the plug parts to facilitate the coupling operation.

7. A coupling comprising a pair of coupling boxes having passageways therethrough together defining a valve chamber intersecting said passageways, a split plug valve rotatably mounted in said chamber having a grooved flange overlying the coupling boxes, upstanding flanges on the coupling boxes seated in the grooves of the overlying flanges, slots in said upstanding flanges, and spring pressed key means carried by said plug parts adapted to drop into said slots in the coupling box flanges for locking the plug parts relative to the coupling boxes.

8. A coupling comprising a pair of complementary coupling boxes having passageways therethrough and together defining an open topped chamber intersecting said passageways, a split plug valve rotatably mounted in said chamber and having a grooved flange overlying the mouth of the chamber, upstanding flanges on said coupling boxes seated in the grooves of the overlying flanges, slots in said upstanding flanges, pins extending through the plug parts, keys on the ends of said pins adapted to ride on the outer faces of the upstanding coupling box flanges, spring means acting on said pins to hold the keys against the flanges whereby said keys will drop into said slots to limit the amount of rotation of the plug parts, and said pins having projecting end portions adapted to be depressed for moving the keys out of the slots whenever the plug parts are brought together for a coupling operation.

9. In a coupling including a coupling box with an upstanding segmental circular flange thereon and a valve for said coupling box having a segmental circular groove receiving said flange, the improvement which comprises said flange having a slot therein and a beveled portion extending into said slot from the outer face of the flange, and a spring pressed key on said valve adapted to ride on the outer face of said flange to follow the beveled portion thereof into said slot for limiting movement of the valve.

10. In a coupling having a pair of coupling boxes together defining a valve chamber with a plurality of ports, and a two-part valve rotatably mounted in said chamber for alternately connecting and sealing said ports while simultaneously coupling and uncoupling the boxes, said valve parts having mating faces adapted to be abutted together for operation of the parts as a unit valve, the improvement of complementary turning lugs on said valve parts having wrench receiving faces substantially parallel with said mating faces of the parts to draw the parts together whenever a wrench engages the wrench-receiving faces and is turned to rotate the parts.

JACOB R. SNYDER.
ARTHUR TOWNHILL.